(12) United States Patent
Jiang et al.

(10) Patent No.: US 12,151,419 B2
(45) Date of Patent: Nov. 26, 2024

(54) HOLLOW BODY MOLDING AID AND MOLDING METHOD

(71) Applicant: YAPP AUTOMOTIVE SYSTEMS CO., LTD., Yangzhou (CN)

(72) Inventors: Lin Jiang, Yangzhou (CN); Songjun Xu, Yangzhou (CN); Lushun Wu, Yangzhou (CN); Dejun Gao, Yangzhou (CN); Zhongya Yang, Yangzhou (CN); Chao Zhang, Yangzhou (CN)

(73) Assignee: YAPP AUTOMOTIVE SYSTEMS CO., LTD., Yangzhou (CN)

( * ) Notice: Subject to any disclaimer, the term of this patent is extended or adjusted under 35 U.S.C. 154(b) by 695 days.

(21) Appl. No.: 17/423,131

(22) PCT Filed: Jan. 9, 2020

(86) PCT No.: PCT/CN2020/071102
§ 371 (c)(1),
(2) Date: Aug. 5, 2021

(87) PCT Pub. No.: WO2020/147640
PCT Pub. Date: Jul. 23, 2020

(65) Prior Publication Data
US 2022/0126498 A1 Apr. 28, 2022

(30) Foreign Application Priority Data
Jan. 15, 2019 (CN) .......................... 201910036566.2

(51) Int. Cl.
 *B29C 49/20* (2006.01)
 *B21D 26/039* (2011.01)
 (Continued)

(52) U.S. Cl.
 CPC ............ *B29C 49/20* (2013.01); *B21D 26/039* (2013.01); *B29C 49/4205* (2013.01);
 (Continued)

(58) Field of Classification Search
 CPC ................ B29C 49/02; B29C 49/0208; B29C 2049/2073; B21D 26/039
 See application file for complete search history.

(56) References Cited

U.S. PATENT DOCUMENTS

2007/0045221 A1* 3/2007 Trude ....................... B65D 1/46
215/382
2009/0045542 A1 2/2009 Borchert et al.
(Continued)

FOREIGN PATENT DOCUMENTS

CN 102958731 A 3/2013
CN 103286939 A 9/2013
(Continued)

*Primary Examiner* — S. Behrooz Ghorishi
*Assistant Examiner* — Alexander A Wang
(74) *Attorney, Agent, or Firm* — Bayramoglu Law Offices LLC (57) ABSTRACT

The hollow body molding aid includes a body, a connector, a first profiling assembly, a second profiling assembly, and a positioning mechanism. The connector is fixedly connected to the body. The first profiling assembly is fixedly disposed on one side of the body and is configured to position one half of a reinforced housing. The second profiling assembly is fixedly disposed on the other side of the body and is configured to position the other half of the reinforced housing. The positioning mechanism is disposed on the first profiling assembly and the second profiling assembly. The reinforced housing can be positioned, thus guaranteeing molding quality of the reinforced housing and blanks. In addition, the reinforced housing can be accurately positioned in a cavity of a mold through a manipulator, without the need to use a plurality of air cylinders for step-by-step driving.

13 Claims, 3 Drawing Sheets

(51) Int. Cl.
B29C 49/42 (2006.01)
B29C 49/78 (2006.01)
B29L 22/00 (2006.01)

(52) U.S. Cl.
CPC ...... *B29C 49/78* (2013.01); *B29C 2049/2073* (2013.01); *B29L 2022/00* (2013.01)

(56) References Cited

U.S. PATENT DOCUMENTS

| | | | | |
|---|---|---|---|---|
| 2009/0239012 | A1* | 9/2009 | Thomasset | B29C 49/071 |
| | | | | 264/531 |
| 2013/0193139 | A1* | 8/2013 | Karsch | B32B 27/12 |
| | | | | 264/166 |
| 2019/0283305 | A1* | 9/2019 | Hayakawa | B29C 49/46 |
| 2020/0238588 | A1* | 7/2020 | Finger | B29C 49/783 |
| 2021/0039299 | A1* | 2/2021 | Takehana | B29C 49/06 |
| 2021/0060600 | A1* | 3/2021 | Nishiyama | B05C 5/0279 |

FOREIGN PATENT DOCUMENTS

| | | |
|---|---|---|
| CN | 203331400 U | 12/2013 |
| CN | 105377528 A | 3/2016 |
| CN | 107073796 A | 8/2017 |
| CN | 109693361 A | 4/2019 |
| JP | H0532137 A | 2/1993 |

\* cited by examiner

HOLLOW BODY MOLDING AID AND MOLDING METHOD

CROSS REFERENCE TO THE RELATED APPLICATIONS

This application is the national phase entry of International Application No. PCT/CN2020/071102, filed on Jan. 9, 2020, which is based upon and claims priority to Chinese Patent Application No. 201910036566.2, filed on Jan. 15, 2019, the entire contents of which are incorporated herein by reference.

TECHNICAL FIELD

The present invention relates to the technical field of hollow body manufacturing, and in particular, to a hollow body molding aid and a hollow body molding method.

BACKGROUND

As plug-in hybrid electric vehicles and extended-range electric vehicles are normally driven by motors, and engines are out of operation for a long time, with the change in diurnal temperature differences and the exchange of heat inside fuel tanks, fuel (such as gasoline) in the fuel tank may generate large temperature difference, causing an increase in vapor pressure inside the fuel tank. Therefore, higher requirements are put forward for anti-pressure capability of the fuel tank.

In the prior art, for enhancing the anti-pressure capability of the fuel tank, vertical support posts are usually disposed in the fuel tank to support wall plates of the fuel tank. However, an increase in high pressure resistant ranges of the fuel tank is limited by disposing the vertical support post, which has poor stability during manufacturing and cannot meet requirements for drop and impact test performance.

SUMMARY

An objective of the present invention is to provide a hollow body molding aid and a hollow body molding method, so as to solve the above problems in the prior art and improve the manufacturing quality and pressure-resistant properties of a hollow body.

The present invention provides a hollow body molding aid, including:
  a body;
  a connector, fixedly connected to the body;
  a first profiling assembly, fixedly disposed on one side of the body and configured to position one half of a reinforced housing;
  a second profiling assembly, fixedly disposed on an other side of the body and configured to position an other half of the reinforced housing; and
  a positioning mechanism, disposed on the first profiling assembly and the second profiling assembly.

In the hollow body molding aid as described above, preferably, the positioning mechanism includes vacuum chucks, disposed at set positions on the first profiling assembly and the second profiling assembly.

The positioning mechanism further includes inductive switches, disposed at set positions on the first profiling assembly and the second profiling assembly.

In the hollow body molding aid as described above, preferably, the body includes a first support plate, a second support plate, and connecting plates, the first support plate is fixedly connected to the second support plate through the connecting plates, the first support plate, the second support plate, and the connecting plates form an accommodation space,
  the first profiling assembly is disposed on the first support plate, the second profiling assembly is disposed on the second support plate, and
  a plurality of through holes are equally formed on each of the connecting plates.

In the hollow body molding aid as described above, preferably, the first profiling assembly includes a first profiling component, a second profiling component, and a third profiling component, the first profiling component, the second profiling component, and the third profiling component are all detachably and fixedly disposed on the body,
  the second profiling assembly includes a fourth profiling component, a fifth profiling component, and a sixth profiling component, and the fourth profiling component, the fifth profiling component, and the sixth profiling component are all detachably and fixedly disposed on the body.

Preferably, the hollow body molding aid as described above further includes backing plates detachably disposed on the body, where the first profiling assembly and the second profiling assembly are respectively fixedly disposed on the backing plates.

The connector includes a fixing base, a first flange plate, a support post, and a second flange plate, clamping jaws are disposed on the fixing base, the clamping jaws are fixedly connected to the body,
  the first flange plate is fixedly connected to the fixing base,
  one end of the support post is fixedly connected to the first flange plate, an other end of the support post is fixedly connected to the second flange plate, and
  the second flange plate is configured to be fixedly connected to a manipulator.

The present invention further provides a hollow body molding method, using the hollow body molding aid provided in the present invention, the method including the following steps:
  fixing one half of the reinforced housing to the first profiling assembly; fixing an other half of the reinforced housing to the second profiling assembly;
  controlling the manipulator to drive the hollow body molding aid to feed the reinforced housing into a cavity of a mold;
  performing blanking on a molten cylindrical blank;
  sealing an open side of the cylindrical blank;
  pre-blowing the cylindrical blank to pre-inflate the cylindrical blank; controlling the mold to close;
  blowing the cylindrical blank at high pressure, so that the molten cylindrical blank is adhered to the reinforced housing and forms an integral part of the reinforced housing;
  cooling the molten cylindrical blank for shaping; and
  controlling the mold to open to take out a molded hollow body.

In the hollow body molding aid as described above, preferably, the controlling the manipulator to drive the hollow body molding aid to feed the reinforced housing into a cavity of a mold specifically includes:
  controlling the manipulator to drive the hollow body molding aid to move to a position between a left half of the mold and a right half of the mold;
  controlling the left half of the mold and the right half of the mold to move toward each other to be closed, so that portions of the reinforced housing on two sides of the hollow body molding aid are respectively adhered and fixed to the left half of the mold and the right half of the mold;

controlling the left half of the mold and the right half of the mold to open; and controlling the manipulator to drive the hollow body molding aid to move out between the left half of the mold and the right half of the mold.

In the hollow body molding aid as described above, preferably, the controlling the manipulator to drive the hollow body molding aid to feed the reinforced housing into a cavity of a mold specifically includes:

controlling the manipulator to drive the hollow body molding aid to move toward a left half of the mold, so that a portion of the reinforced housing on one side of the hollow body molding aid is adhered and fixed to the left half of the mold;

controlling the manipulator to drive the hollow body molding aid to move to a right half of the mold, so that a portion of the reinforced housing on an other side of the hollow body molding aid is adhered and fixed to the right half of the mold; and controlling the manipulator to drive the hollow body molding aid to move out between the left half of the mold and the right half of the mold.

In the hollow body molding aid as described above, preferably, the portions of the reinforced housing on the two sides of the hollow body molding aid are respectively adhered and fixed to the left half of the mold and the right half of the mold by creating negative pressures respectively between the portion of the reinforced housing on the one side of the hollow body molding aid and the left half of the mold and between the portion of the reinforced housing on the other side of the hollow body molding aid and the right half of the mold.

In the hollow body molding aid as described above, preferably, during the performing blanking on the cylindrical blank, the method further includes:

insulating the cylindrical blank by using a blank insulation apparatus.

By means of the hollow body molding aid and the hollow body molding method provided in the present invention, a reinforced housing can be positioned by using the first profiling assembly and the second profiling assembly, thus guaranteeing molding quality of the reinforced housing and blanks. In addition, the reinforced housing can be accurately positioned in a cavity of a mold through a manipulator, without the need to use a plurality of air cylinders for step-by-step driving. In the meanwhile, in the case that a plurality of interlinked air cylinders are adopted, a problem that the reinforced housing is offset from a mold after the reinforced housing is placed in the mold due to a loosened screw at a position on an air cylinder can be avoided.

BRIEF DESCRIPTION OF THE DRAWINGS

The following further describes specific implementations of the present invention in detail with reference to the accompanying drawings.

LIST OF REFERENCE NUMERALS

| | | |
|---|---|---|
| 100-Body | 110-First support plate | 120-Second support plate |
| 130-Connecting plate | 131-Through hole | 200-First profiling assembly |
| 210-First profiling component | 220-Second profiling component | 230-Third profiling component |
| 300-Second profiling assembly | 400-Vacuum chuck | 500-Connector |
| 510-Fixing base | 511-Clamping jaw | 520-First flange plate |
| 530-Support post | 540-Second flange plate | 600-Inductive switch |
| 700-Backing plate | | |

DETAILED DESCRIPTION OF THE EMBODIMENTS

A detail description of the embodiments of the present invention will be given in the following, and examples of the embodiments are illustrated in the accompanying drawings, throughout which identical or similar elements or elements of identical or similar functions are denoted by identical or similar reference numerals. The embodiments described below with reference to the accompanying drawings are exemplary, and are only used for interpreting the present invention, instead of limiting the present invention.

Figure 1:
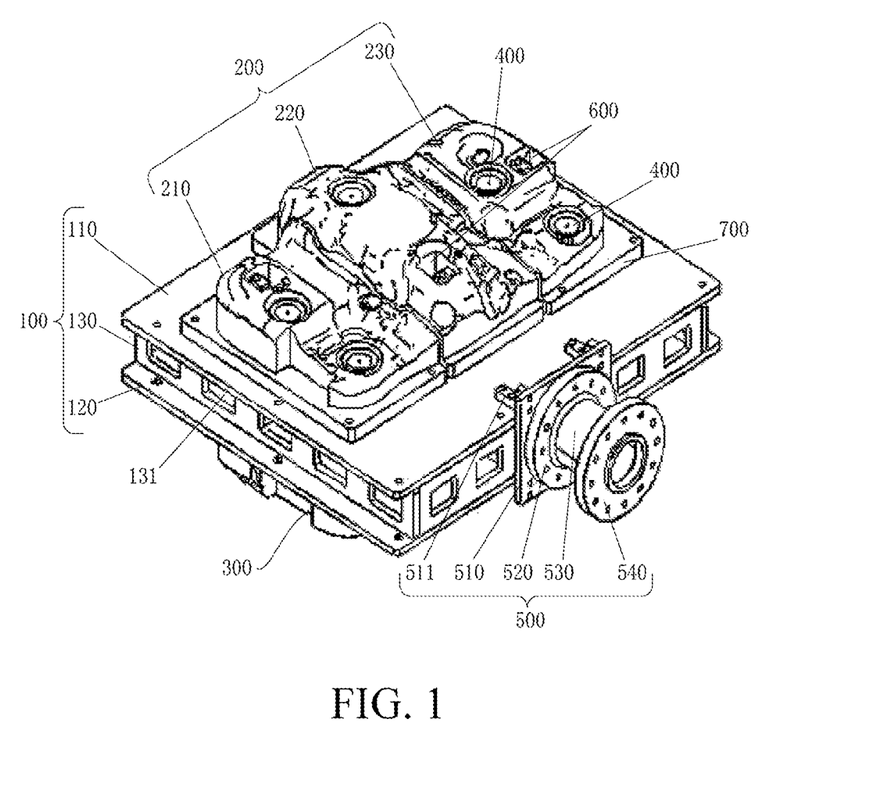
FIG. 1 is a schematic structural diagram of a hollow body molding aid according to an embodiment of the present invention.
Figure 2:
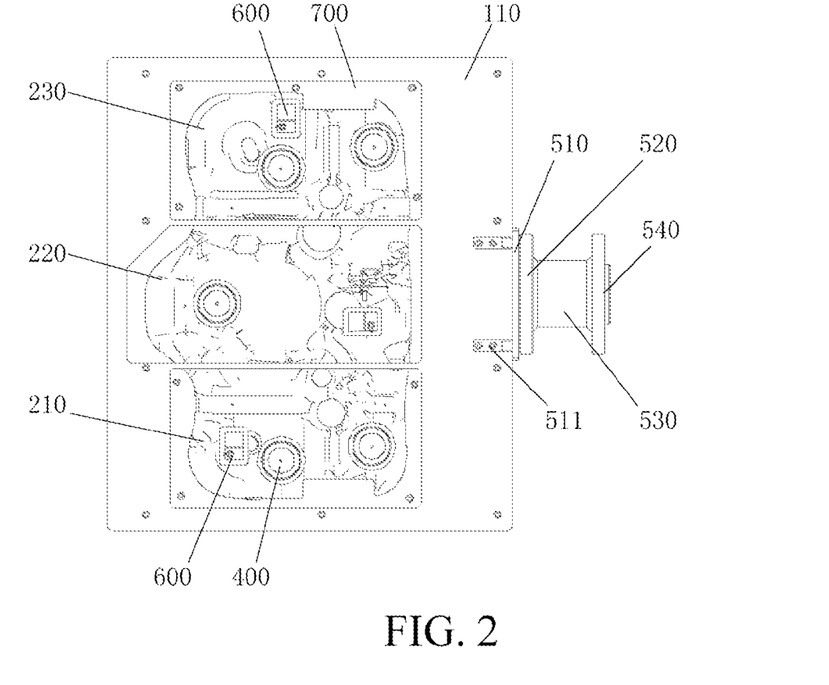
FIG. 2 is a top view of the hollow body molding aid according to an embodiment of the present invention.
Figure 3:
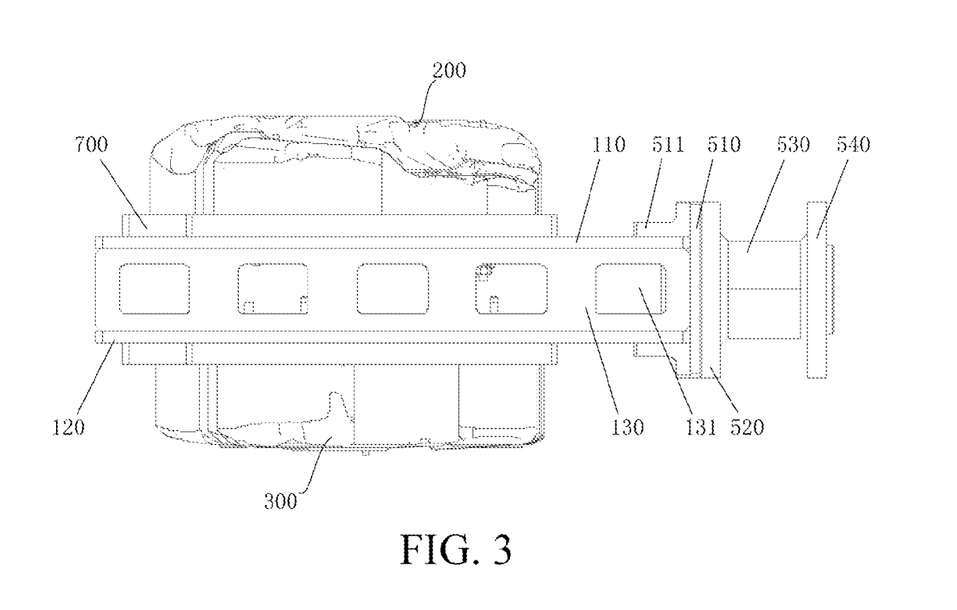
FIG. 3 is a side view of the hollow body molding aid according to an embodiment of the present invention.

Referring to FIG. 1 to FIG. 3 together, an embodiment of the present invention provides a hollow body molding aid provided, including a body 100, a connector 500, a first profiling assembly 200, a second profiling assembly 300, and a positioning mechanism. The connector 500 is fixedly connected to the body 100. The first profiling assembly 200 is fixedly disposed on one side of the body 100 and is configured to position one half of a reinforced housing. The second profiling assembly 300 is fixedly disposed on an other side of the body 100 and is configured to position an other half of the reinforced housing. The positioning mechanism is disposed on the first profiling assembly 200 and the second profiling assembly 300.

During operation, one half of the reinforced housing may be fixed to the first profiling assembly 200, and the other half of the reinforced housing may be fixed to the second profiling assembly 300. The positioning of the reinforced housing before molding can be implemented through the positioning mechanism. The hollow body molding aid may be fixed to a manipulator through the connector 500 and is driven to move through the manipulator, so that the reinforced housing can be fed into a cavity of a mold. After the hollow body molding aid reaches a preset position in the cavity, the reinforced housing can be adhered and fixed to an inner wall of the cavity between the reinforced housing and the inner wall of the cavity by performing vacuumizing, and then the manipulator is used to drive the hollow body molding aid to move out of the cavity, so as to achieve follow-up blanking and molding in the cavity. Compared with the prior art, the hollow body molding aid may accurately position the reinforced housing in a cavity of a mold through a manipulator, without the need to use a plurality of air cylinders for step-by-step driving. In the meanwhile, in the case that a plurality of interlinked air cylinders are adopted, a problem that the reinforced housing is offset from a mold after the reinforced housing is placed in the mold due to a loosened screw at a position on an air cylinder can be avoided.

Specifically, the positioning mechanism may include vacuum chucks 400. The vacuum chucks 400 are disposed at set positions on the first profiling assembly 200 and the second profiling assembly 300. When the reinforced housing is placed on the first profiling assembly 200 and the second profiling assembly 300, the reinforced housing may be adhered and fixed through the vacuum chucks 400 to implement positioning, and stability can be ensured during follow-up transportation to the cavity of the mold. A plurality of vacuum chucks 400 may be disposed on each of the first profiling assembly 200 and the second profiling assembly 300 to further guarantee the reliability for adhering the reinforced housing.

Further, the positioning mechanism may further include inductive switches 600. The inductive switches 600 are disposed at set positions on the first profiling assembly 200 and the second profiling assembly 300. The inductive switches 600 can ensure that the reinforced housing is mounted on the first profiling assembly 200 and the second profiling assembly 300 in place.

As shown in FIG. 1, the first profiling assembly 200 may include a first profiling component 210, a second profiling component 220, and a third profiling component 230. The first profiling component 210, the second profiling component 220, and the third profiling component 230 are all detachably and fixedly disposed on the body 100. The second profiling assembly 300 may include a fourth profiling component, a fifth profiling component, and a sixth profiling component. The fourth profiling component, the fifth profiling component, and the sixth profiling component are all detachably and fixedly disposed on the body 100. Therefore, by disposing the plurality of profiling components, targeted positioning of set parts on the reinforced housing can be implemented, and in the meanwhile, the profiling components can be conveniently assembled, disassembled, and replaced, so as to meet positioning requirements for different reinforced housings, thus implementing the versatility of the hollow body molding aid.

It may be understood that, for ease of attaching and positioning of a surface of the reinforced housing, shapes of the positioning faces on the profiling components can match shapes of positioning profiles on the reinforced housing.

Further, in order to improve structural strength of the body 100, the body 100 may include a first support plate 110, a second support plate 120, and connecting plates 130. The first support plate 110 is fixedly connected to the second support plate 120 through the connecting plates 130. The first support plate 110, the second support plate 120, and the connecting plates 130 form an accommodation space. The first profiling assembly 200 is disposed on the first support plate 110, and the second profiling assembly 300 is disposed on the second support plate 120. A vacuum pump for providing a vacuum adsorption force for the vacuum chucks 400 may be disposed in the accommodation space, and the accommodation space may also be configured to store wire harnesses, thus reducing occupation of the space outside the hollow body molding aid. In addition, a plurality of through holes 131 may be equally formed on each of the connecting plates 130, so as to facilitate threading in and out of the wire harnesses and facilitate the debugging of the parts such as the vacuum pump in the accommodation space.

Further, the hollow body molding aid further includes backing plates 700. The backing plates 700 are detachably disposed on the body 100, and the first profiling assembly 200 and the second profiling assembly 300 are respectively fixedly disposed on the backing plates 700. Therefore, the first profiling assembly 200 and the second profiling assembly 300 can be conveniently assembled and disassembled without damaging the first profiling assembly 200 and the second profiling assembly 300.

Specifically, the connector 500 may include a fixing base 510, a first flange plate 520, a support post 530, and a second flange plate 540. Clamping jaws 511 are provided on the fixing base 510, and the clamping jaws 511 are fixedly connected to the body 100. The first flange plate 520 is fixedly connected to the fixing base 510. One end of the support post 530 is fixedly connected to the first flange plate 520, and an other end of the support post 530 is fixedly connected to the second flange plate 540. The second flange plate 540 is configured to be fixedly connected to a manipulator. The clamping jaws 511 may be fixedly connected to the body 100 through screws, and in the meanwhile, by disposing the first flange plate 520 and the second flange plate 540, the reliability of connection between the hollow body molding aid and the manipulator can be enhanced.

Figure 4:
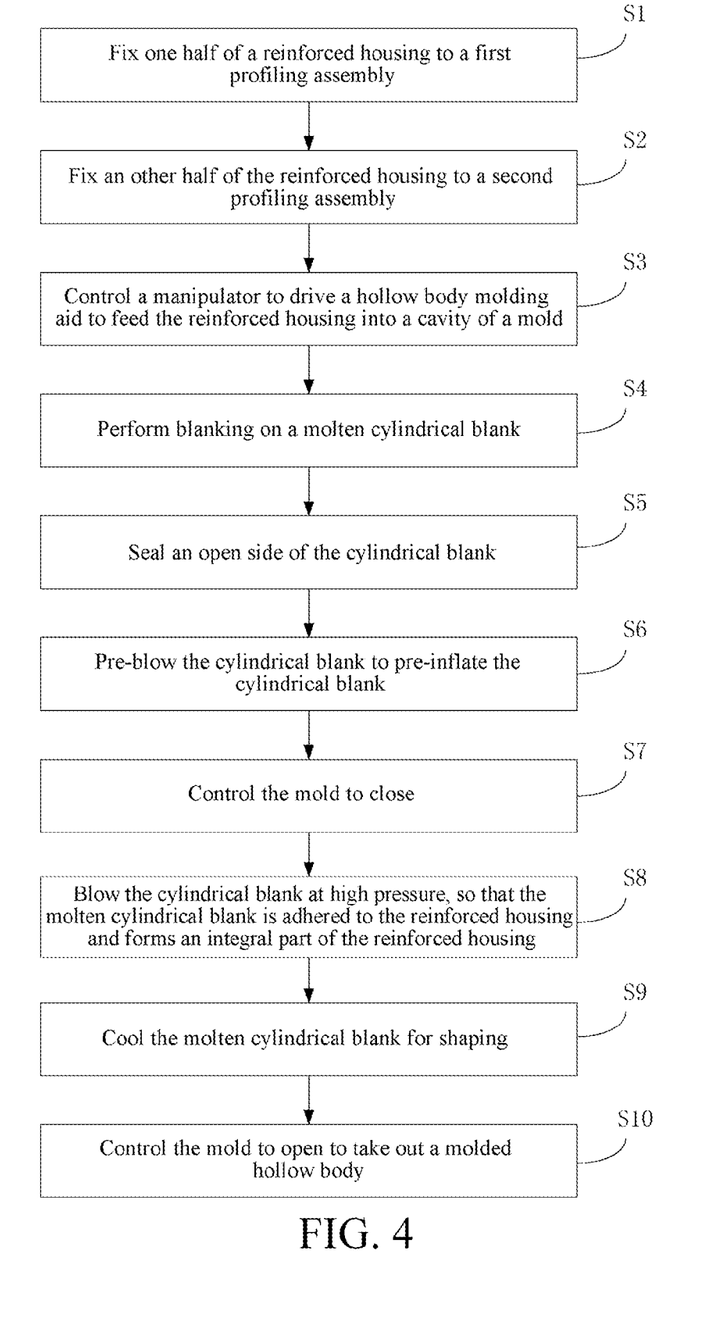
FIG. 4 is a flowchart of a hollow body molding method according to an embodiment of the present invention.

As shown in FIG. 4, the present invention further provides a hollow body molding method. The method adopts the hollow body molding aid provided in any of the embodiments of the present invention, and includes the following steps.

Step S1: Fix one half of the reinforced housing to the first profiling assembly. Step S2: Fix an other half of the reinforced housing to the second profiling assembly.

Step S3: Control the manipulator to drive the hollow body molding aid to feed the reinforced housing into a cavity of a mold.

Specifically, in one embodiment, step S3 may specifically include the following steps.

Step S301: Control the manipulator to drive the hollow body molding aid to move to a position between a left half of the mold and a right half of the mold.

Step S302: Control the left half of the mold and the right half of the mold to move toward each other to be closed, so that portions of the reinforced housing on two sides of the hollow body molding aid are respectively adhered and fixed to the left half of the mold and the right half of the mold.

Step S303: Control the left half of the mold and the right half of the mold to open.

Step S304: Control the manipulator to drive the hollow body molding aid to move out between the left half of the mold and the right half of the mold.

In addition, in another embodiment, step S3 may specifically include the following steps.

Step S31: Control the manipulator to drive the hollow body molding aid to move toward a left half of the mold, so that a portion of the reinforced housing on one side of the hollow body molding aid is adhered and fixed to the left half of the mold.

Step S32: Control the manipulator to drive the hollow body molding aid to move to the right half of the mold, so that a portion of the reinforced housing on an other side of the hollow body molding aid is adhered and fixed to the right half of the mold.

The manipulator may also be controlled to first move toward the right half of the mold and then toward the left half of the mold, which is not limited in this embodiment.

Step S33: Control the manipulator to drive the hollow body molding aid to move out between the left half of the mold and the right half of the mold.

The portions of the reinforced housing on the two sides of the hollow body molding aid are respectively adhered and fixed to the left half of the mold and the right half of the mold by creating negative pressures respectively between the portion of the reinforced housing on the one side of the hollow body molding aid and the left half of the mold and between the portion of the reinforced housing on the other side of the hollow body molding aid and the right half of the mold. Therefore, the reinforced housing is adhered and fixed by creating the negative pressures, which can avoid problems such as scratching of the reinforced housing when being fixed by using a specific structure.

Step S4: Perform blanking on a molten cylindrical blank.

Step S5: Seal an open side of the cylindrical blank.

Step S6: Pre-blow the cylindrical blank to pre-inflate the cylindrical blank. Therefore, the molten blank can be prevented from adhering to each other, and it is convenient for a blowing needle to pierce the blank to perform blowing at high pressure.

Step S7: Control the mold to close.

Step S8: Blow the cylindrical blank at high pressure, so that the molten cylindrical blank is adhered to the reinforced housing and forms an integral part of the reinforced housing.

Step S9: Cool the molten cylindrical blank for shaping. Specifically, cooling can be implemented for shaping by drawing circulating cooling water into the cavity, In order to prevent the cylindrical blank from shrinking during cooling, high pressure blowing can be continuously performed on the inner wall of the cylindrical blank during the cooling of the cylindrical blank.

Step S10: Control the mold to open to take out a molded hollow body. Therefore, the hollow body formed by combining the reinforced housing and the blank can have better pressure resistant properties.

It should be noted that, in order to avoid excessive heat loss of the blank during the performing blanking on the cylindrical blank, the cylindrical blank may be insulated by using a blank insulation apparatus.

By means of the hollow body molding aid and the hollow body molding method provided in the embodiments of the present invention, a reinforced housing can be positioned by using the first profiling assembly and the second profiling assembly, thus guaranteeing molding quality of the reinforced housing and blanks. In addition, the reinforced housing can be accurately positioned in a cavity of a mold through a manipulator, without the need to use a plurality of air cylinders for step-by-step driving. In the meanwhile, in the case that a plurality of interlinked air cylinders are adopted, a problem that the reinforced housing is offset from a mold after the reinforced housing is placed in the mold due to a loosened screw at a position on an air cylinder can be avoided.

The structure, features, and effects of the present invention are described in detail through the embodiments shown in the drawings. The foregoing description is merely preferred embodiments of the present invention, and the present invention does not limit the scope of implementation as shown in the drawing. All changes made according to the concept of the present invention or modified equivalent embodiments with equivalent changes shall fall within the protection scope of the present invention without departing from the spirit of the specification and drawings.

What is claimed is:

1. A hollow body molding aid, comprising:
   a body;
   a connector, fixedly connected to the body;
   a first profiling assembly, wherein the first profiling assembly is fixedly disposed on a first side of the body and configured to position a first half of a reinforced housing;
   a second profiling assembly, wherein the second profiling assembly is fixedly disposed on a second side of the body and configured to position a second half of the reinforced housing; and
   a positioning mechanism, disposed on the first profiling assembly and the second profiling assembly;
   wherein the body comprises a first support plate, a second support plate, and connecting plates, the first support plate is fixedly connected to the second support plate through the connecting plates, the first support plate, the second support plate, and the connecting plates form an accommodation space, the first profiling assembly is disposed on the first support plate, the second profiling assembly is disposed on the second support plate, and a plurality of through holes are equally formed on each of the connecting plates.

2. The hollow body molding aid according to claim 1, wherein the positioning mechanism comprises vacuum chucks disposed at first set positions on the first profiling assembly and the second profiling assembly, and the positioning mechanism further comprises inductive switches disposed at second set positions on the first profiling assembly and the second profiling assembly.

3. The hollow body molding aid according to claim 1,
   wherein the first profiling assembly comprises a first profiling component, a second profiling component, and a third profiling component,
   the first profiling component, the second profiling component, and the third profiling component are all detachably and fixedly disposed on the body,
   the second profiling assembly comprises a fourth profiling component, a fifth profiling component, and a sixth profiling component, and
   the fourth profiling component, the fifth profiling component, and the sixth profiling component are all detachably and fixedly disposed on the body.

4. The hollow body molding aid according to claim 1, further comprising backing plates detachably disposed on the body,
   wherein the first profiling assembly and the second profiling assembly are respectively fixedly disposed on the backing plates,
   the connector comprises a fixing base, a first flange plate, a support post, and a second flange plate,
   wherein clamping jaws are disposed on the fixing base,
   the clamping jaws are fixedly connected to the body,
   the first flange plate is fixedly connected to the fixing base,
   a first end of the support post is fixedly connected to the first flange plate,
   a second end of the support post is fixedly connected to the second flange plate, and
   the second flange plate is configured to be fixedly connected to a manipulator.

5. A hollow body molding method, using a hollow body molding aid, wherein
   the hollow body molding aid comprises:
   a body;
   a connector, fixedly connected to the body;
   a first profiling assembly, wherein the first profiling assembly is fixedly disposed on a first side of the body and configured to position a first half of a reinforced housing;
   a second profiling assembly, wherein the second profiling assembly is fixedly disposed on a second side of the body and configured to position a second half of the reinforced housing; and a positioning mechanism, disposed on the first profiling assembly and the second profiling assembly;
wherein the body comprises a first support plate, a second support plate, and connecting plates, the first support plate is fixedly connected to the second support plate through the connecting plates, the first support plate, the second support plate, and the connecting plates form an accommodation space, the first profiling assembly is disposed on the first support plate, the second profiling assembly is disposed on the second support plate, and a plurality of through holes are equally formed on each of the connecting plates;
the method comprising the following steps:
fixing the first half of the reinforced housing to the first profiling assembly;
fixing the second half of the reinforced housing to the second profiling assembly;
controlling a manipulator to drive the hollow body molding aid to feed the reinforced housing into a cavity of a mold;
performing blanking on a molten cylindrical blank;
sealing an open side of the molten cylindrical blank;
pre-blowing the molten cylindrical blank to pre-inflate the molten cylindrical blank;
controlling the mold to close;
blowing the molten cylindrical blank at high pressure, wherein the molten cylindrical blank is adhered to the reinforced housing and forms an integral part of the reinforced housing;
cooling the molten cylindrical blank for shaping; and
controlling the mold to open to take out a molded hollow body.

6. The hollow body molding method according to claim 5, wherein the step of controlling the manipulator to drive the hollow body molding aid to feed the reinforced housing into the cavity of the mold comprises:
controlling the manipulator to drive the hollow body molding aid to move to a position between a left half of the mold and a right half of the mold;
controlling the left half of the mold and the right half of the mold to move toward each other to be closed, wherein portions of the reinforced housing on two sides of the hollow body molding aid are respectively adhered and fixed to the left half of the mold and the right half of the mold;
controlling the left half of the mold and the right half of the mold to open; and
controlling the manipulator to drive the hollow body molding aid to move out between the left half of the mold and the right half of the mold.

7. The hollow body molding method according to claim 6, wherein a first portion of the reinforced housing on a first side of the hollow body molding aid, and a second portion of the reinforced housing on the second side of the hollow body molding aid are respectively adhered and fixed to the left half of the mold and the right half of the mold by creating negative pressures respectively between the first portion of the reinforced housing on the first side of the hollow body molding aid and the left half of the mold, and between the second portion of the reinforced housing on the second side of the hollow body molding aid and the right half of the mold.

8. The hollow body molding method according to claim 5, wherein the step of controlling the manipulator to drive the hollow body molding aid to feed the reinforced housing into the cavity of a mold comprises:
controlling the manipulator to drive the hollow body molding aid to move toward a left half of the mold, wherein a first portion of the reinforced housing on a first side of the hollow body molding aid is adhered and fixed to the left half of the mold;
controlling the manipulator to drive the hollow body molding aid to move toward a right half of the mold, wherein a second portion of the reinforced housing on a second side of the hollow body molding aid is adhered and fixed to the right half of the mold; and
controlling the manipulator to drive the hollow body molding aid to move out between the left half of the mold and the right half of the mold.

9. The hollow body molding method according to claim 8, wherein the first portion of the reinforced housing on the first side of the hollow body molding aid and the second portion of the reinforced housing on the second side of the hollow body molding aid are respectively adhered and fixed to the left half of the mold and the right half of the mold by creating negative pressures respectively between the first portion of the reinforced housing on the first side of the hollow body molding aid and the left half of the mold, and between the second portion of the reinforced housing on the second side of the hollow body molding aid and the right half of the mold.

10. The hollow body molding method according to claim 5, wherein the step of performing blanking on the molten cylindrical blank further comprises: insulating the molten cylindrical blank by using a blank insulation apparatus.

11. The hollow body molding method according to claim 6, wherein the positioning mechanism comprises vacuum chucks disposed at first set positions on the first profiling assembly and the second profiling assembly, and the positioning mechanism further comprises inductive switches disposed at second set positions on the first profiling assembly and the second profiling assembly.

12. The hollow body molding method according to claim 5, wherein the first profiling assembly comprises a first profiling component, a second profiling component, and a third profiling component,
the first profiling component, the second profiling component, and the third profiling component are all detachably and fixedly disposed on the body;
the second profiling assembly comprises a fourth profiling component, a fifth profiling component, and a sixth profiling component, and
the fourth profiling component, the fifth profiling component, and the sixth profiling component are all detachably and fixedly disposed on the body.

13. A hollow body molding method, using a hollow body molding aid, wherein
the hollow body molding aid comprises:
a body;
a connector, fixedly connected to the body;
a first profiling assembly, wherein the first profiling assembly is fixedly disposed on a first side of the body and configured to position a first half of a reinforced housing;
a second profiling assembly, wherein the second profiling assembly is fixedly disposed on a second side of the body and configured to position a second half of the reinforced housing; and
a positioning mechanism, disposed on the first profiling assembly and the second profiling assembly;
wherein the hollow body molding aid further comprises backing plates detachably disposed on the body, wherein the first profiling assembly and the second profiling assembly are respectively fixedly disposed on the backing plates, the connector comprises a fixing base, a first flange plate, a support post, and a second flange plate, wherein clamping jaws are disposed on the fixing base, the clamping jaws are fixedly connected to the body, the first flange plate is fixedly connected to the fixing base, a first end of the support post is fixedly connected to the first flange plate, a second end of the support post is fixedly connected to the second flange plate, and the second flange plate is configured to be fixedly connected to a manipulator;

wherein the method comprising the following steps:

fixing the first half of the reinforced housing to the first profiling assembly;

fixing the second half of the reinforced housing to the second profiling assembly;

controlling a manipulator to drive the hollow body molding aid to feed the reinforced housing into a cavity of a mold;

performing blanking on a molten cylindrical blank;

sealing an open side of the molten cylindrical blank;

pre-blowing the molten cylindrical blank to pre-inflate the molten cylindrical blank;

controlling the mold to close;

blowing the molten cylindrical blank at high pressure, wherein the molten cylindrical blank is adhered to the reinforced housing and forms an integral part of the reinforced housing;

cooling the molten cylindrical blank for shaping; and controlling the mold to open to take out a molded hollow body.

\* \* \* \* \*